Oct. 1, 1968 C. A. TABOR 3,403,748
SEISMIC WAVE GENERATOR
Filed June 9, 1967 2 Sheets-Sheet 2

INVENTOR.
CHARLES A. TABOR
BY
Cushman, Darby & Cushman
ATTORNEYS

12 United States Patent Office 3,403,748
Patented Oct. 1, 1968

3,403,748
SEISMIC WAVE GENERATOR
Charles A. Tabor, 604 S. Avenue D,
Kermit, Texas 79745
Filed June 9, 1967, Ser. No. 644,870
10 Claims. (Cl. 181—.5)

ABSTRACT OF THE DISCLOSURE

A seismic pulse generating apparatus having a combustion chamber formed by a piston and cylinder with energizable electromagnets which force the piston and cylinder together to increase the compression of the combustible mixture in the compression chamber prior to ignition and generation of the seismic pulse.

Background description and prior art

The present invention relates generally to an apparatus for generating seismic pulses. The invention is specifically concerned with an improved apparatus for generating seismic impulses without the necessity of drilling seismic shot holes.

The use of seismic impulses for the study of the earth's substrata is well known in the art and generally comprises the generation of a seismic disturbance at or near the earth's outer surface by suitable means. A portion of the seismic impulse or disturbance travels downwardly through the inner earth surface until it encounters a subsurface discontinuity, such as in interface between strata, which will cause a reflection of a portion of the seismic energy back towards the outer surface of the earth. Sensitive detection devices, such as geophones, placed in the vicinity of the generated seismic disturbance detect the reflected seismic wave energy. By measuring the time intervals between the initiation of the seismic impulses and the reception of the reflected energies at each of many detection stations, it is possible to determine the nature and structure of the underlying earth subsurface. The use of seismic impulses has found particular utility in prospecting for petroleum.

Of the various seismic techniques employed in the search for earth structures favorable for the accumulation of oil and gas deposits, probably the most well known is the so-called shot hole method wherein a shot hole is drilled into the ground and a suitable explosive charge, such as dynamite, is detonated within the shot hole to generate the desired seismic impulses. While the shot hole method has enjoyed considerable success, various other seismic exploration systems such as the so-called "weight drop method" and the "explosion method" have been developed which eliminate the costly necessity of drilling shot holes.

In the "weight drop method" a heavy weight is lifted above the earth's surface and dropped in order to generate the desired seismic impulse. According to the "explosion method," to which the present invention most closely relates, the seismic shock is generated by the explosion of a suitable explosive charge, such as a mixture of propane and oxygen within a pan-like member which rests upon the ground surface with its upper portion being enclosed and sealed, by means of a suitable gasket, within a heavy weight member, typically weighing in the neighborhood of eight tons. Among the drawbacks of such apparatus is the susceptibility of the relatively expensive pan member to damage from the explosion. In addition, the gasket employed to effect a seal between the periphery of the pan and the superposed weight member, which typically comprises a large neoprene rubber O-ring, can, and often does, permit the escape of the exploding mixture and consequent damage to the equipment and its surroundings. A further and more significant disadvantage of such prior "explosion method" apparatus is the limited magnitude of the seismic impulse which can be generated thereby because such apparatus are capable of developing only a relatively limited compression of the explosive fuel mixture prior to its ignition.

Briefly, the present invention employs a downwardly opening cylindrical housing or cylinder which is slidably disposed over a suitable piston means with the bottom or lower face of the piston supported upon the earth's surface. A combustion chamber adapted to receive a suitable charge of a combustible gas or other combustible fluid mixture is defined between the upper end surface of the piston and the enclosing surface of the cylindrical housing. In order to increase the compression of the combustible charge and thereby increase the efficiency of the explosion and create a greater impact with a resulting larger seismic impulse, electromagnetic means are associated with the housing to decrease the volume of the combustion chamber by forcing the housing closer to the upper face of the piston. The force of the explosion within the combustion chamber is transmitted as a shock wave or seismic impulse through the piston means directly to the surface of the earth. The seismic impulse so generated is directed through the earth's surface therebelow and any reflections can be detected in a conventional manner by the appropriate well known apparatus. To dampen the reaction force acting upon the cylindrical housing itself, additional weight can be placed upon the housing means.

A principal object of the present invention is to provide an improved seismic wave generating apparatus.

A further object of the present invention is to provide an improved seismic wave generating device wherein increased compression of the combustible mixture which is used to generate the impulse is readily attainable.

Another object of the present invention is to increase the versatility of the apparatus used to generate a seismic impulse through the explosion method. Apparatus embodying the present invention can, without compromising its high efficiency, be built in various sizes, making it adaptable to the many different terrains where seismic exploration is desirable.

A still further object of the present invention is to provide an apparatus which readily permits both the compression and fuel mixture to be altered, so as to meet the requirements for various seismic impulse prospecting applications.

Another object of the present invention is to provide an apparatus capable of generating a greater seismic impulse, by a more efficient fuel mixture combustion, while also eliminating undesirable inconsistent ignitions and secondary seismic waves which commonly occur with heretofore available equipment.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses. Reference is now being made to the accompanying drawings, which form a part hereof, wherein.

Detailed description of the invention

Figure 1:
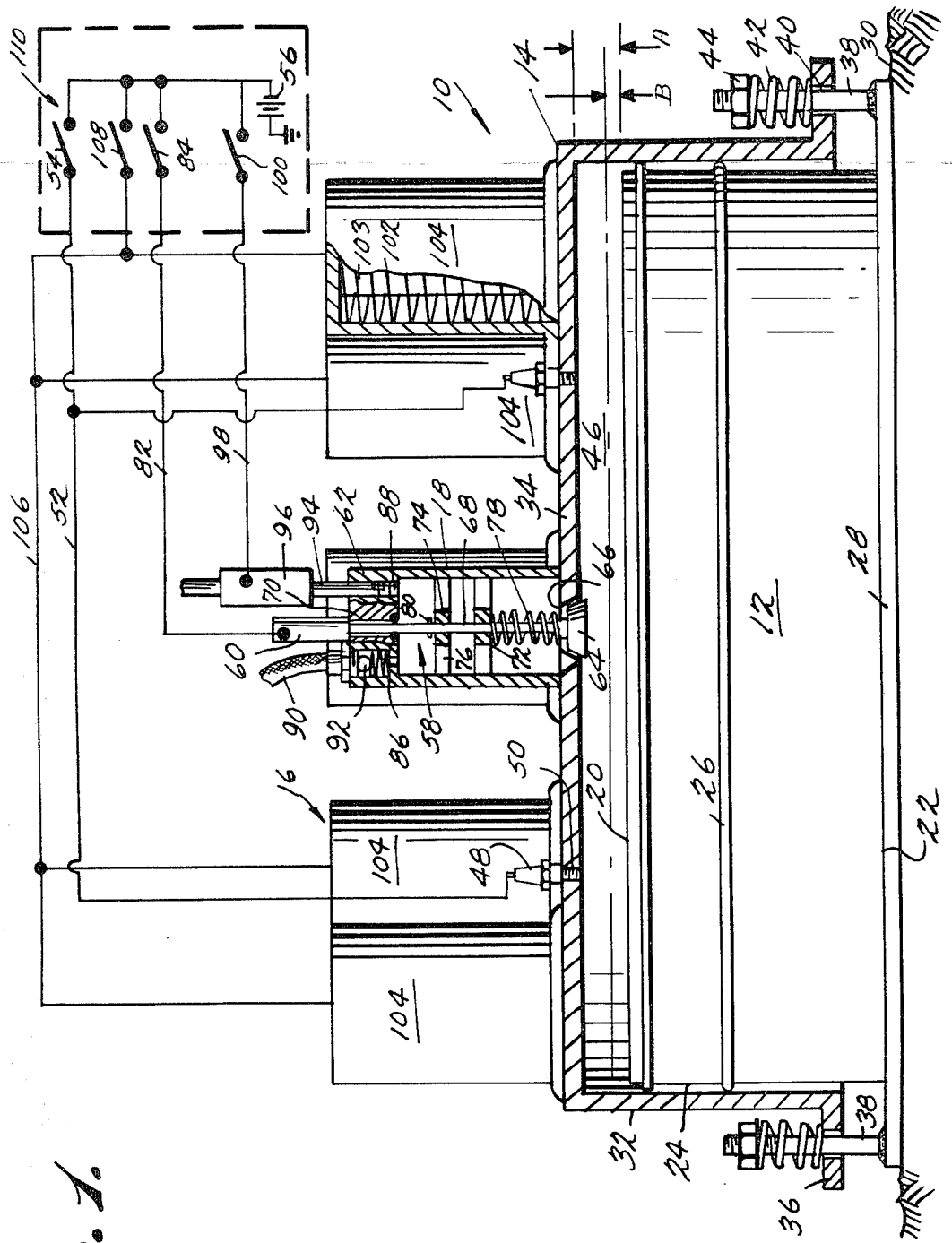
FIGURE 1 is a cross-sectional view of the seismic generator embodying the present invention.
Figure 2:
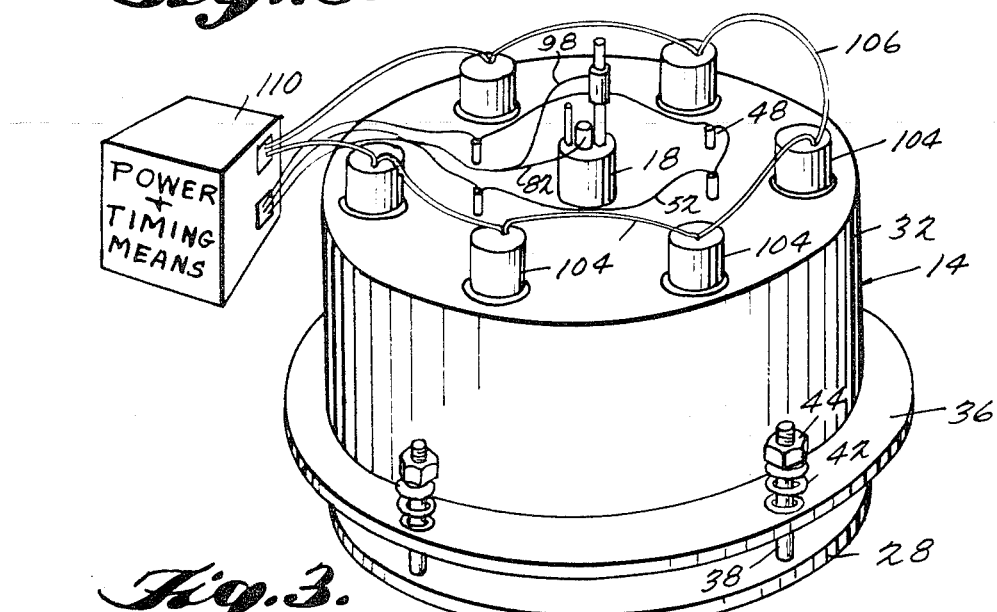
FIGURE 2 is a perspective view of the seismic generator shown in FIGURE 1 illustrating the particular placement of the electromagnetic generators and a power supply and timing means.

Referring now to FIGURES 1 and 2 of the drawings, the seismic pulse generating apparatus of the present invention is generally indicated by reference character 10. The apparatus comprises a ferrous metal, preferably steel, piston 12, which is responsive to a magnetic attraction force, and a complementary superposed hollow cylindrical housing 14 having eletcromagnetic means 16 and an intake-exhaust manifold 18 mounted thereon.

Piston 12 includes an upper end face 20, a lower end face 22 and a cylindrical exterior sidewall surface 24 provided with piston rings 26 which are mounted on the sidewall 24 intermediate end faces 20, 22. In the embodiment illustrated in FIGURES 1 and 2, a plate 28 is connected to the piston mass 12 so as to be interposed between the lower end face 22 of the piston 12 and the earth's surface 30. Alternatively, the plate 28 can be omitted and the lower end face 22 of piston 12 can be placed in direct engagement with the earth's surface 30.

Housing 14 comprises a cylindrical sidewall 32, an upper end wall 34, and a peripheral flange 36 extending outwardly from the lower terminal portion of the sidewall. Plate 28, and consequently, piston 12 are connected to housing 14 by circumferentially-spaced studs 38, which are welded or secured in some other suitable manner, to the upper surface of plate 28 adjacent the outer edge of the plate. The studs 38 pass through apertures 40 in the flange 36 and have helical springs 42 mounted thereon, which extend between the upper surface of flange 36, and nuts 44, which are threadedly mounted on studs 38. The helical springs are provided to dampen the relative oscillation of the housing 14 and piston 12 during movement, so that no damage will be incurred by the housing or piston when the apparatus is moved about.

As shown in FIGURE 1, housing 14 is elevated with respect to piston 12 with a variable volume combustion chamber 46 being defined between the housing 14 and the upper end face 20 of piston 12. Housing 14 is raised relative to piston 12 due to the pressure exerted on the inner surface of the upper end wall 34 by the pressurized fuel mixture which is introduced into the combustion chamber 46. Since chamber 14, which is quite heavy, must be raised from its lowermost position by the pressurized fuel mixture, sidewall 32 of housing 14 is greater in height than sidewall 24 of piston 12. This assures that there will be a small clearance between the upper end face 20 of piston 12 and the inner surface of housing end wall 34 so that the entire inner surface of end wall 34 is subjected to the pressure of the fuel mixture, even in its lowermost position. Further, to assure that the compression pressure is maintained during operation of apparatus 10, the piston rings 26, which are carried by piston sidewall 24, slidably and sealingly engage the cylindrical inner surface of sidewall 32 of the housing 14.

Combustion chamber 46 is provided with one or more spark plugs 48, which are threadedly mounted within apertures 50, extending through the upper end face of housing 14. The spark plugs are annularly spaced relative to one another and are all connected, as diagrammatically shown in FIGURE 1, through a common lead wire 52 and switch 54 to a suitable source of electrical energy 56, such as a battery.

Chamber 46 is provided with an intake-exhaust valve 58 mounted within the hollow cylindrical manifold 18 and actuated by a solenoid 60 centrally mounted on the upper end plate 62 of the manifold. The valve comprises a frusto-conical head 64, which cooperates with a complementary aperture or valve seat 66 centrally located in the upper end wall 34 of housing 14, and a stem 68, which forms the core of the solenoid 60. The stem 68 is slidably mounted in an aperture 70 located in end plate 62 and guide ring elements 72, 74 which are secured by spokes 76 to interior surface of the manifold sidewall. A helical coil spring 78 and a retaining ring 80 are mounted on the valve stem with the spring extending between the head 64 of the valve and the lower guide element 72, while the retaining ring 80 is mounted intermediate end plate 62 and the upper guide element 74.

As diagrammatically shown in FIGURE 1, solenoid 60 is connected to the power source 56 through lead wire 82 and switch 84. When the switch 84 is opened, coil spring 78 unseats valve 58 and causes the valve to be extended until the retaining ring 80 engages guide element 74. When the switch 84 is closed, the solenoid 60 is energized and the valve is retracted until the head is seated in aperture or valve seat 66.

The intake and exhaust manifold 18 is also provided with an intake or fuel port 86 and an exhaust port 88 located in the end plate 62. Intake port 86 is connected to a pressurized supply of fuel (not shown) by fuel line 90 and is provided with a spring-biased one-way ball check valve 92, which normally seals fuel line 90 with respect to the manifold and prevents any exhaust gases from entering the line when the combustion chamber is purged. However, when it is desired to charge the combustion chamber, valve 92 is easily opened by the pressurized fuel which is admitted to the fuel line. Exhaust port 88 communicates through an exhaust line 94 with a two-way solenoid actuated valve 96. The solenoid valve 96 is connected through lead wire 98 and switch 100 to a source of electrical energy and is controlled in such a manner that the valve is closed when the combustion chamber is being charged and opened when the combustion chamber is being purged of the exhaust gases.

Suitable electromagnetic means 16, such as electromagnetic windings 102, referably surrounding a soft iron core 103, are carried by the upper end wall 34 of the housing 14 for drawing housing 14 and piston 12 together. The windings are preferably enclosed by suitable covers 104, are insulated and, as shown diagrammatically in FIGURE 1, are energized by power source 56 which is connected to the coils through suitable electrical conductors or lead wires 106 and a switch 108.

Switches 54, 84, 100, 108, and thus the energization of the spark plugs, solenoids and coils, are controlled by and contained within a suitable electrical timing distributor means 110 well known in the art, with housing 14 providing a ground for the electrical system. Of course, it is to be understood that other conventional means, not shown, are provided in the ignition system for the spark plugs to facilitate proper sparking. Thus, the ignition of the fuel within the chamber along with the energization of the solenoids, and coils are all coordinated so as to ensure proper operation of the apparatus.

Figure 3:
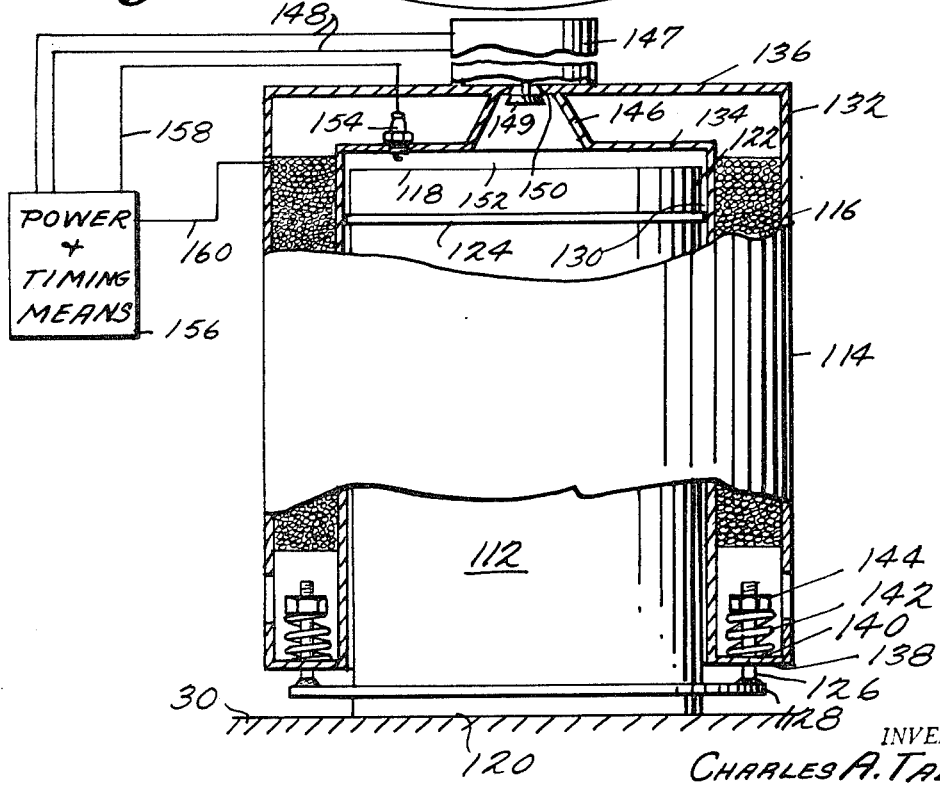
FIGURE 3 is an elevational view, partly in section, of a modified form of the present invention.

FIGURE 3 illustrates a modified form of the invention comprising a cylindrical ferrous metal piston 112 and a complementary superposed hollow housing 114. Here, the electromagnetic windings 116 are located within the perpendicular hollow walls of housing 114 instead of being on the upper surface of the housing as in the previous embodiment. However, the functional operation and purpose of the electromagnetic windings remain the same as in the embodiment displayed in FIGURES 1 and 2.

Referring to FIGURE 3, piston 112 comprises an upper end face 118, a lower end face 120 and a cylindrical exterior sidewall 122 having piston rings 124 mounted thereon intermediate end faces 118 and 120. Piston 112 is slidably received within the housing 114 and is connected thereto by means of studs 126, which extend from and are welded or suitably secured to an annular flange 128 located adjacent the lower end face 120 of the piston. Of course, while as shown, flange 128 is integral with piston 112, the flange could be omitted and, as in the embodiment of FIGURES 1 and 2, a plate could be substituted for the flange intermediate the lower end face of the piston and the ground.

Housing 114 has an inner and outer spaced apart cylindrical sidewalls 130, 132 respectively, inner and outer spaced apart upper end walls 134, 136 extending from the sidewalls 130, 132 respectively, and a lower end wall 138 extending between the sidewalls and provided with apertures 140 through which studs 126 pass. As in the first embodiment, to dampen relative movement of housing 114 and piston 112, helical springs 142 are mounted on the studs 126 intermediate the upper surface of the lower end wall 138 and nuts 144 which are threadedly secured to the studs.

Inner end wall 134 has a centrally located upwardly extending frusto-conical portion 146 which abuts and is secured to the inner surface of outer end wall 136. An intake and exhaust manifold 147, which is the same as manifold 18 shown in FIGURE 1, is mounted on the outer end wall 136, connected through lead wires 148 to a conventional electrical timing distributor and source of electrical energy 156, and provided with intake-exhaust valve 149 extending through an aperture 150 in end walls 136. The combustion chamber 152, which is sealed by means of piston rings 124, is defined between the upper end face 118 of piston 112, and the inner end wall 134 of housing 114. The chamber is provided with one or more spark plugs 154 threadedly mounted in apertures located in inner end wall 134 and suitably connected to the conventional electrical timing distributor and source of electrical energy 156 by means of lead wire 158. As with the previous embodiment, the sidewalls of housing 114 are of such a length relative to the sidewall of piston 112, that a slight clearance is provided between the end face of piston 112 and the inner end wall 134 of the housing 114 when the chamber has been exhausted, whereby the pressurized fuel may act against the entire inner surface of the end wall to raise the heavy housing.

Suitable electromagnetic means, such as electromagnetic windings 116 are mounted between the sidewalls 130 and 132 of housing 114 and are connected to the electrical power source and distributor means 156 by lead wire 160. The windings are insulated and are wound in a conventional manner so that the electromagnetic force generated when they are energized will draw the housing 114 and piston 112 together, reducing the volume of the combustion chamber 152 and compressing the fuel mixture.

As in the first embodiment, the energization of the spark plugs 150, the coil windings 116 and the solenoids of the intake and exhaust manifold is controlled by a conventional electrical timing distributor 156. Thus, the ignition of the fuel within the combustion chamber, along with the energization of the solenoid and coils, are all coordinated so as to ensure proper operation of the apparatus.

While not shown in the drawings, large weights of 10,000 pounds or more are placed on the housings 14 or 114. These weights help compress the fuel mixture and also dampen the upward force of the explosion within the combustion chamber, directing the impulse created by the explosion through piston 12 or 112 into the ground.

In the operation of the embodiment of FIGURE 1, the apparatus 10 is located on the ground 30 with plate 26 or a lower end face of piston 12 in contact with the ground. At the start of the cycle, solenoid exhaust valve 96 is closed, solenoid 60 is de-energized allowing valve 58 to open, coil windings 102 are de-energized and a valve, not shown, is opened, which permits pressurized fuel such as propane and oxygen or air to enter intake line or fuel line 90. The pressurized fuel opens and bypasses check valve 92 and flows through manifold 18 into combustion chamber 46 causing housing 14 to rise to position A relative to piston 12. After the combustion chamber has been charged with a predetermined amount of fuel, the valve connecting the intake line 90 with the source of pressurized fuel is turned off and solenoid 60 is energized retracting valve 58 until it is seated. Coil windings 102 are then energized with the electromagnetic force thus created, pulling housing 14 down relative to piston 12 from position A to position B, as indicated in FIGURE 1, and compressing the fuel mixture within the combustion chamber. The amount of electrical energy supplied to the coils and thus, the attractive force pulling the piston and housing together, can be varied to obtain the compression desired.

Now that the fuel has been compressed to the desired degree, the spark plugs 48 are energized igniting the fuel mixture within the combustion chamber. The resultant explosion is transmitted through piston 12 to the earth, creating the desired seismic impulse. The reflection of the seismic impulse from the different strata in the earth is then detected by geophone receivers and properly recorded.

After the ignition takes place, the solenoid exhaust valve 96 is opened, coils 102 are de-energized, and solenoid 60 is de-energized permitting valve 58 to open. The weight of housing 14 then forces the exhaust gases out through manifold 18 and exhaust valve 96 purging the combustion chamber and readying the apparatus for the next cycle.

The embodiment of FIGURE 3 operates in substantially the same manner as the first embodiment of the invention. The pressurized fuel is introduced through the intake and exhaust manifold 147 into combustion chamber 152, causing housing 114 to rise relative to piston 112. Valve 149 is now closed and the coils 116 are energized with the electromagnetic force thus created drawing housing 114 down relative to piston 112, thereby compressing the fuel mixture within the combustion chamber. The fuel mixture is then ignited, created the impulse, after which the exhaust gases are purged from the combustion chamber 152 in the same manner as discussed above with regard to the first embodiment.

While the preferred form of the invention has been shown and described, it is to be understood that all suitable modifications and equivalents may be resorted to which fall within the scope of the invention as claimed.

What is claimed is:

1. A seismic pulse generating apparatus comprising: a piston responsive to a magnetic attraction force and adapted to be positioned on the ground, said piston being slidably received within a housing, a variable volume combustion chamber defined between the exterior upper end surface of the piston and the interior upper end surface and adjacent interior sidewall surface of said housing, means for charging said variable volume combustion chamber with a fuel mixture, electromagnetic means for causing controlled relative movement of said piston and housing toward one another to decrease the volume of said variable volume combustion chamber and thereby effect a regulated compression of said fuel mixture, means for igniting said fuel mixture to thereby generate the seismic pulse which is transmitted through the piston to the ground, and means for purging exhaust gases from said variable volume combustion chamber after generation of the seismic pulse.

2. The seismic pulse generating apparatus of claim 1 wherein rings for sealing the variable volume combustion chamber are carried by an exterior sidewall of the piston, said rings slidably and sealingly engaging the interior sidewall surface of the housing.

3. In the seismic pulse generating apparatus of claim 2, means connecting said piston to said housing and means associated with said connecting means for dampening relative oscillations of the piston and housing.

4. The seismic pulse generating apparatus of claim 1 wherein the electromagnetic means are carried by said housing.

5. A seismic pulse generating apparatus of claim 1 wherein the electromagnetic means comprise a plurality of electromagnetic windings carried by an upper end wall of said housing, each of said windings surrounding a soft iron core.

6. The seismic pulse generating apparatus of claim 1 wherein the electromagnetic means are carried by the sidewall of said housing.

7. The seismic pulse generating apparatus of claim 1 wherein the electromagnetic means are mounted within a hollow sidewall of said housing.

8. The seismic pulse generating apparatus of claim 1 wherein said means for charging said variable volume combustion chamber with a fuel mixture includes an inlet port means in the upper end surface of said housing for admitting a pressurized fuel mixture to said variable volume combustion chamber to charge said variable volume combustion chamber and cause relative movement of said piston and housing away from one another.

9. The seismic pulse generating apparatus of claim 1 wherein said means for purging exhaust gases from said variable volume combustion chamber after generation of the seismic pulse includes an outlet port means in the upper end surface of said housing for permitting venting of said exhaust gases which are forced out through said outlet port as said housing and said piston return to their respective initial positions after generation of said seismic pulse.

10. The seismic pulse generating apparatus of claim 1 wherein said means for charging said variable volume combustion chamber with a fuel mixture and said means for purging exhaust gases from said variable volume combustion chamber after generation of the seismic pulse include an inlet and outlet port means in the upper end surface of said housing for admitting a pressurized fuel mixture to said variable volume combustion chamber to charge said variable volume combustion chamber and cause relative movement of said piston and housing away from one another and for permitting venting of said exhaust gases which are forced out through said inlet and outlet port means as said housing and said piston return to their respective initial positions after generation of said seismic pulse.

References Cited

UNITED STATES PATENTS

| | | | |
|---|---|---|---|
| 1,753,368 | 4/1930 | Du Bois-Reymond et al. | 181—.5 |
| 3,044,452 | 7/1962 | McCrory et al. | 181—.5 |
| 3,198,282 | 8/1965 | Dunaway | 181—.5 |
| 3,260,327 | 7/1966 | McCollum | 181—.5 |
| 3,294,194 | 12/1966 | Sloan | 181—.5 |
| 3,302,744 | 2/1967 | Lemm | 181—.5 |

BENJAMIN A. BORCHELT, *Primary Examiner.*

G. H. GLANZMAN, *Assistant Examiner.*